INVENTOR.
ROBERT S. SALTZMAN
BY Harry J. McCauley
ATTORNEY

Nov. 8, 1966  R. S. SALTZMAN  3,283,644
APPARATUS FOR DETERMINING THE CONCENTRATION OF DISPERSED
PARTICULATE SOLIDS IN LIQUIDS
Filed Nov. 27, 1962  4 Sheets-Sheet 3

INVENTOR.
ROBERT S. SALTZMAN
BY Harry J. McCauley
ATTORNEY

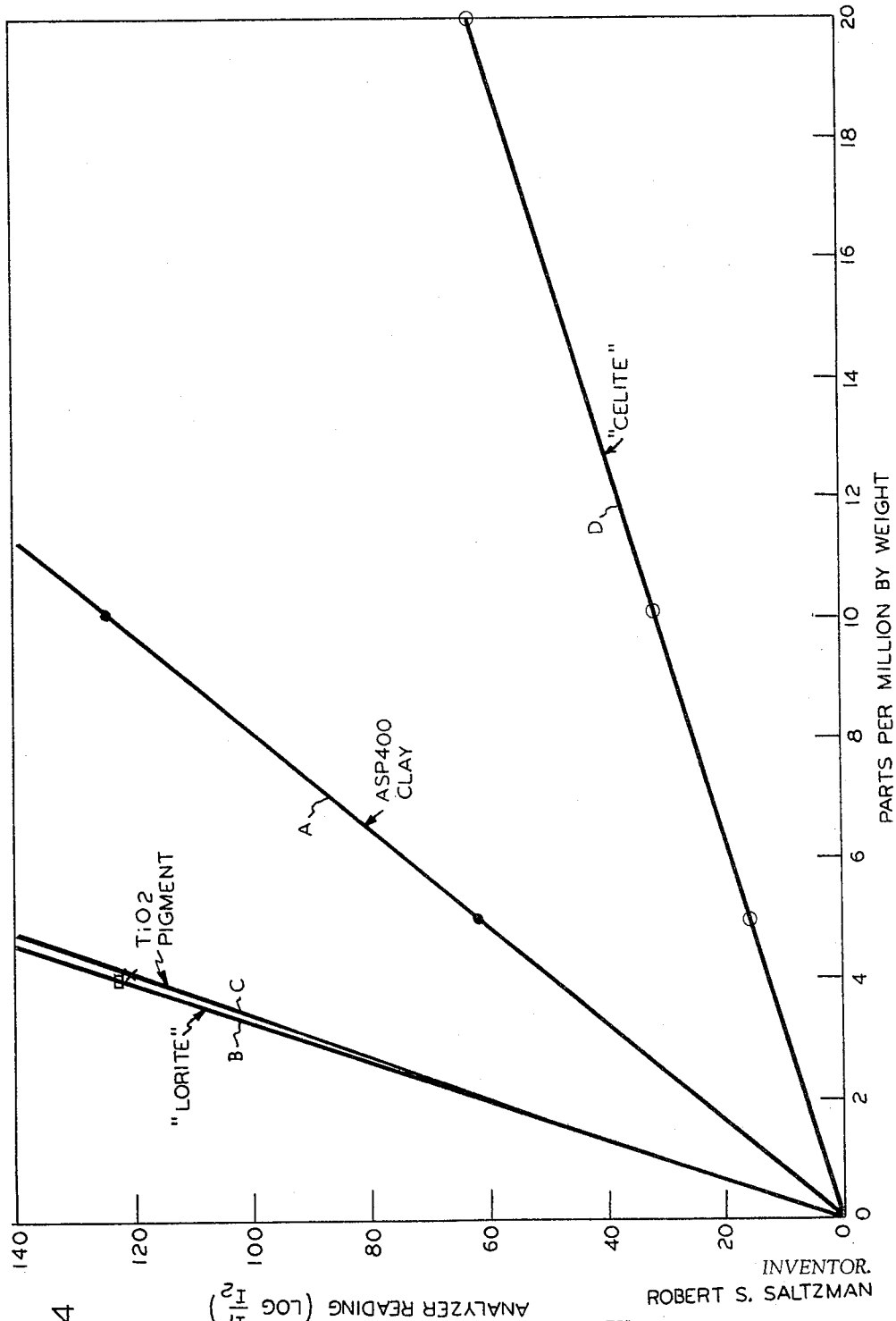

United States Patent Office 3,283,644
Patented Nov. 8, 1966

3,283,644
APPARATUS FOR DETERMINING THE CONCENTRATION OF DISPERSED PARTICULATE SOLIDS IN LIQUIDS
Robert S. Saltzman, Newark, Del., assignor to E. I. du Pont de Nemours and Company, Wilmington, Del., a corporation of Delaware
Filed Nov. 27, 1962, Ser. No. 240,254
1 Claim. (Cl. 88—14)

This invention relates to an analytical method and apparatus, and particularly to an analytical method and apparatus for determining low solids concentrations of particles dispersed in liquids.

There exists a variety of instruments for the measurement of the concentration of suspended solids in liquids, a number of which rely on scattered light as one of their sensed criteria, such as those taught in U.S. Patents 2,873,644, 2,892,378 and 2,962,926. Unfortunately, all of these display an appreciable sensitivity to even relatively slight changes in the color or absorbance of the liquid component of the suspension, considerably impairing their effectiveness as analytical apparatus for process evaluation and control.

Figure 1:
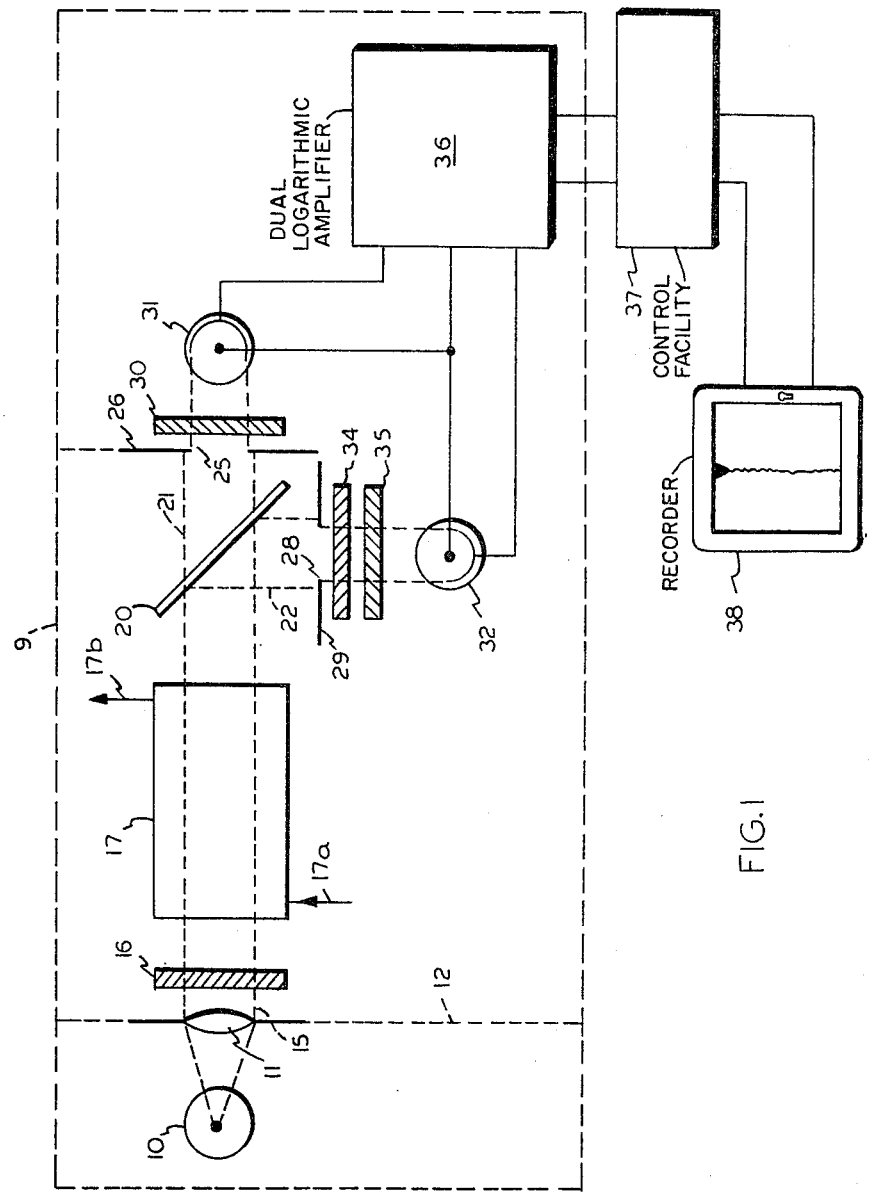
Figure 2:
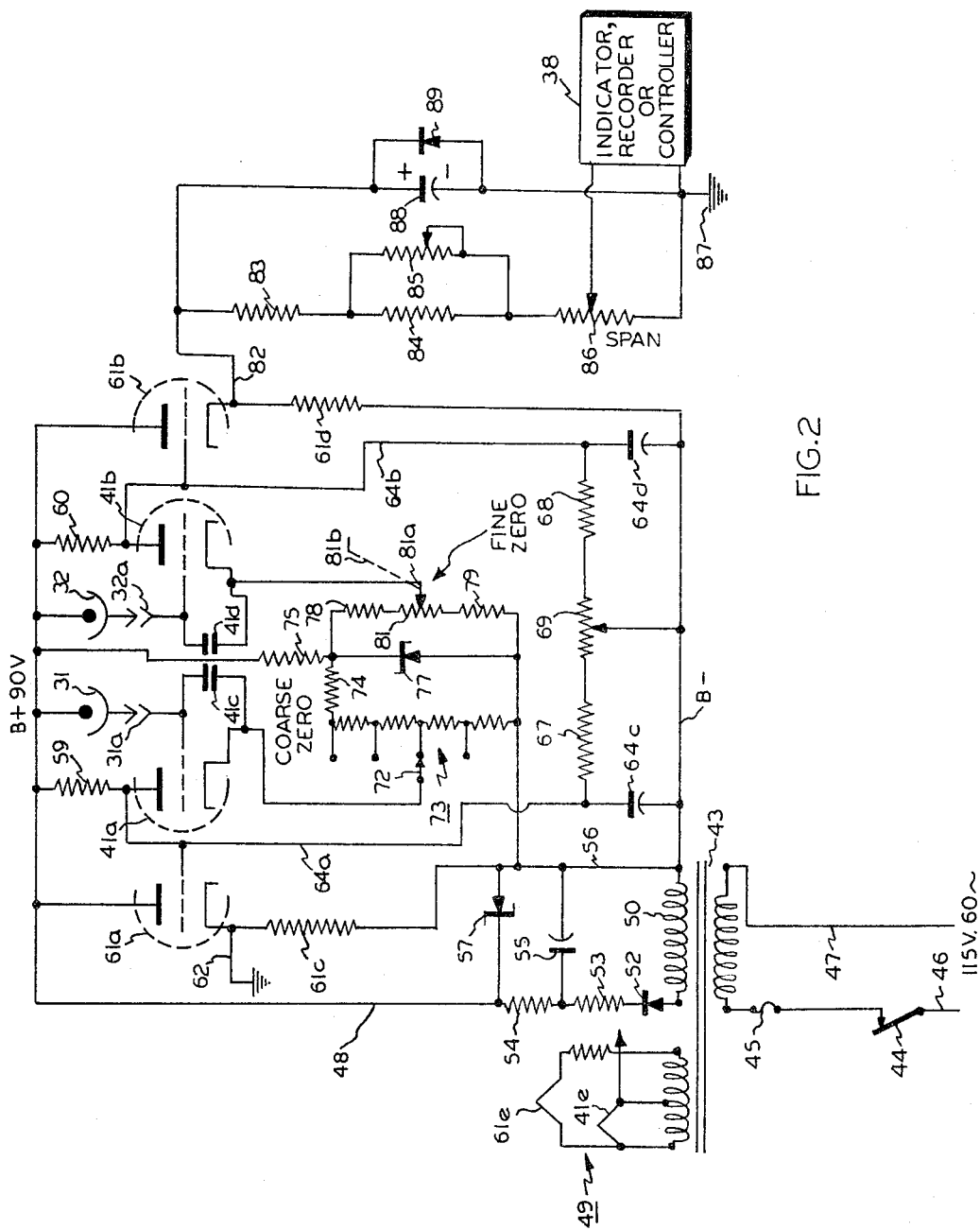
Figure 3:
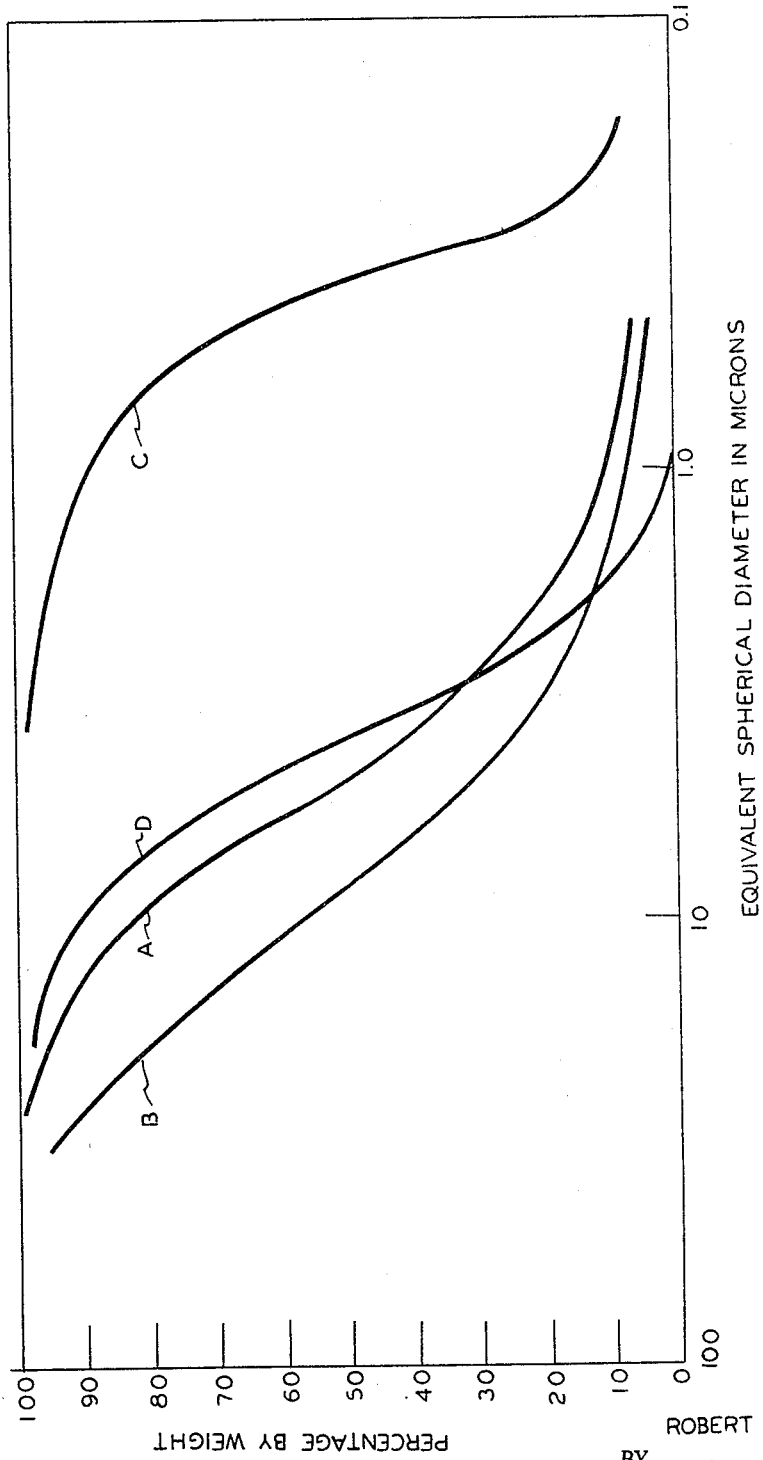

An object of this invention is to provide an improved method and apparatus for determining low solids concentrations of particles dispersed in liquids, including not only suspensions of fine particles but also dispersions of quite coarse particles, such as those formed when relatively high velocity liquid streams contact a solid phase and entrain solid particles therefrom by the shear sweep of the liquid velocity. Another object of this invention is to provide an improved method and apparatus for determining low solids concentrations in liquids which is substantially free of interference from appreciable changes of color or absorbance of the liquid component of the mixture. Other objects of this invention include the provision of an apparatus for determining low solids concentrations of particles dispersed in liquids which dispenses entirely with moving parts, is economical to manufacture, is simple in construction and use, and is adapted to use in conjunction with an existing photometric method and apparatus employed for general analysis, thereby enlarging the general-purpose analytical capability of the latter while, at the same time, saving the expense of electrical detection gear for solids concentration analysis solely, subject, of course, to the availability of such a general analysis photometric apparatus. The manner in which these and other objects of this invention are attained will become clear from the following detailed description and the drawings, in which:

FIG. 1 is a schematic representation of a preferred embodiment of apparatus constructed according to this invention, FIG. 2 is a schematic representation of a preferred embodiment of electrical circuit for the apparatus of FIG. 1, FIG. 3 is a semi-logarithmic plot of particle size analyses for four specific water-insoluble solid substances which were thereafter dispersed in water as the liquid component in different concentrations and subjected to analysis with the apparatus of this invention, and FIG. 4 is a plot of analyzer readings in terms of log $I_1/I_2$ vs. parts per million by weight for water dispersions of the substances of FIG. 3.

Generally, this invention comprises a method for determining the low solids concentration of particles dispersed in liquids comprising, in sequence, plane polarizing radiation within the range of about 210 m$\mu$ to about 1200 m$\mu$ to obtan an analytical radiation, passing the analytical radiation through a sample in inspection, thereby producing forward scattering of the analytical radiation by particulate solids dispersed in the liquid of the sample, splitting radiation passed by the sample into a first separate beam and a second separate beam, polarizing the radiation in the first separate beam in a plane substantially 90° crossed with that of the analytical radiation for the condition when a solids-free sample is being viewed, preadjusting the intensity of radiation in the second separate beam to substantial equality with the intensity of radiation in the first separate beam after the polarizing of the first separate beam for the condition when a solids-free sample is being viewed, and determining the low solids concentration of particles dispersed in the liquid of the sample in inspection as a function of the ratio of the intensity of radiation transmitted in the first separate beam to the intensity of radiation transmitted in the second separate beam, together with apparatus for accomplishing the method.

This invention is based on the discovery that, if ordinary white light is plane polarized and thereafter made to traverse a transparent sample cell, such as one fabricated from ordinary glass, which is not optically rotatory as regards plane polarized radiation, appreciable forward scattering of the radiation occurs, with concomitant alteration of the plane of polarization due to the presence of particulate solids dispersed in the liquid of a sample placed in the sample cell, and that the concentration of these solids is a function of this alteration. Moreover, it has been found that quite appreciable color changes in the liquid component of the sample exert little or no interfering effect on the determination of particulate solids concentration by my invention, which is highly advantageous from the standpoint of practical utilization of the method, especially as regards industrial applications. The reasons for the operation of this invention are not well understood; however, the forward scattering effected by the suspended solids particles appears to be more in the nature of a depolarization of the analytical raidation, rather than an optical rotation. It is probably a complex phenomenon, which could also include elliptical, circular and other non-planar polarization effects.

Referring to FIG. 1, the optical system of a preferred embodiment of this invention is mounted within a light-tight housing 9 indicated schematically in broken line representation. The radiation source 10 is a tungsten lamp (typically a type G.E. 1209), powered through a step-down transformer of 5 v. output supplied from the usual 60 c., 110–120 v. household leads (not detailed). The portion of radiation utilized in analysis is preferably collimated by lens 11 mounted in a suitable port provided in light-impervious partition wall 12, and then delivered as a parallel beam 15 passed to plane polarizer 16 in line with the sample cell 17. Polarizer 16, producing the analytical radiation of this invention, can be any of a wide variety of conventional polarization media, such as, for example, Nicol prisms, sheet material containing polarizing crystals and the like, whereas sample cell 17 can be fabricated from ordinary clear glass or the like (typically 0.03125" to 20" inside length), imposing no rotary action on the polarized radiation output of 16.

The radiation thence passes to beam splitter 20, which again is conventional and provides two separate radiation beams, that denoted 21 being arbitrarily referred to in this description and the claims as the "first" beam, whereas that denoted 22 is referred to as the "second" beam. A suitable beam splitter 20 is a semi-transparent mirror, such as a "Vycor" silica plate which is approximately 6% reflecting and 90% transmitting, or any semi-transparent mirror which has a reflectance of from about 6% to 60% and a transmittance from about 90% to 10%, which delivers a transmitted beam 21 and a reflected beam 22.

The path of beam 21 is through a width-limiting round aperture 25 provided in light-impervious partition wall 26, whereas the path of beam 22 is through equal size width-limiting round aperture 28 in light-impervious partition wall 29, these apertures each accommodating the radiation expanse to the sensitive elements of the radiation-responsive detectors hereinafter described.

Plane polarizer 30, similar in all respects to plane polarizer 16, but having its plane of polarization crossed substantially 90° to the plane of polarization of 16, is interposed across the first radiation beam, which thereafter impinges on radiation detector 31. It is essential, as hereinafter explained more fully in connection with the operation of the apparatus, that the intensity of radiation in the second beam be preadjusted to substantial equality with the intensity of radiation in the first beam for the condition where sample cell 17 is filled with solids-free liquid, and this is conveniently accomplished with light polarizers in the preferred embodiment now described, it being understood that this preadjustment can be just as effectively accomplished by the use of a neutral gray filter or the like interposed across beam 22.

Where polarizers are used for preadjustment of the second beam, polarizer 34 is a plane polarizer which is identical with polarizer 16 and has its plane of polarization aligned with it. Polarizer 35, in optical train with 34, is also a plane polarizer with plane of polarization approximately 90° crossed with that of polarizer 34, so that, by careful rotation of 35 about its axis, the radiation brought to impingement on radiation detector 32 of the second path can be substantially equalized with that impinging on detector 31. It is preferred that polarizer 34 precede polarizer 35 in the path of radiation travel from beam splitter 20; however, the reverse arrangement is also operable, except with some slight loss in sensitivity in the measurement effected. Radiation detectors 31 and 32 can typically be type 935 vacuum phototubes.

The electrical pickup circuit inclusive of radiation detectors 31 and 32 can be any one of a number of conventional radiation intensity ratio measuring circuits; however, a dual logarithmic amplifier, indicated by block 36, is preferred, this being used in conjunction with a conventional control facility 37 delivering its output signal to linear recorder 38 responsive thereto.

A detailed electrical circuit of appropriate design is shown in FIG. 2, wherein phototubes 31 and 32, respectively, introduce, via jack connectors 31a and 32a, the quantitative electrical currents corresponding to the radiations impinging on their cathodes to the grids of triode sections 41a and 41b of a dual triode amplifier tube (typically a type 5692). The grids are capacitor-coupled to the triode cathodes in conventional manner through 500 μμf. capacitors 41c and 41d. These triode sections are each operated in a compound sense, in that the cathode-anode voltage of each section is logarithmically related to the current flowing in the associated input circuits constituting phototubes 31 and 32 and the individual grids and cathodes, all as described at pp. 40–41 in "Principles of Electron Tubes" by H. J. Reich, published by McGraw-Hill Book Co., N.Y. (1941), and also in the original paper of L. H. Germer, Physical Review 25, p. 795 (1925).

Operating power is supplied from transformer 43 having its primary winding connected through main switch 44 and fuse 45 to the usual 115 v. 60 c. power leads 46 and 47. It is convenient to utilize two separate secondary windings, of which that denoted generally at 49 powers the cathode resistance heaters 41e and 61e of triode sections 41a, 41b and 61a, 61b, hereinafter described, respectively, whereas that denoted at 50 supplies power to the two triode sections per se. The 90 v. B+ supply is furnished by bus 48 connected with rectifier diode 52 (typically a type 1N2484–F6) via resistors 53 (typically 470 ohms value) and 54 (typically 5.1K ohms), between which a capacitor 55 (typically 30 μf.) is shunt-connected to the B— bus 56. A Zener diode 57 is similarly connected in shunt across the transformer secondary leads in order to better regulate the B+ voltage.

The plates of the two triode sections 41a and 41b are connected to B+ through plate load resistors 59 and 60, respectively (each typically 3 megohms value), and impedance matching is obtained by direct coupling the outputs of triode sections 41a and 41b to the grids of triode sections 61a and 61b of another dual triode tube (typically a type 5692). The coupling leads 64a and 64b are capacitor-coupled to B— through capacitors 64c and 64d, respectively (each typically 0.05 μf.). A gain balancing network consisting of resistors 67 and 68 (each typically one megohm value) separated by potentiometer 69 (typically 5 megohm value), having its tap connected to B—, is provided in shunt connection across leads 64a and 64b. Triode sections 61a and 61b have their anodes direct-connected to the 90 v. B+ common, and their cathodes connected to the B— bus through resistors 61c and 61d, respectively (each typically 30K ohms value), a ground connection being provided at 62 directly with the cathode of section 61a.

The electric circuit elements hereinafter described, up to, but not including, indicator-recorder 38, are all properly part of control facility 37, FIG. 1, although no common enclosing block has been drawn in in FIG. 2 in order to simplify the showing.

Coarse zero adjustment in the null balancing is achieved by a conventional single pole, 5-position switch arm 72, connected to the cathode of 41a, adapted to optionally cut in one or more of the four resistors (each typically 3.5K ohms value) connected in series in the network indicated generally at 73 interposed between B— and B+, resistors 74 (typically 4K ohm) and 75 (typically 16K ohm) being connected in series with the low-resistance end of network 73. Zener diode 77 is connected as a voltage regulator between resistor 75 and B—.

Fine zero adjustment is obtained by a network shunt-connected around Zener diode 77 made up of series-connected resistors 78 and 79 (typically 4.5K ohm and 2.5K ohm, respectively) between which is interposed a potentiometer 81 (typically 2K ohm value), which can conveniently be a 10-turn helical type having its movable contact 81a direct-connected to the cathode of triode section 41b. Contact 81a is adjusted manually (or is motor-driven in motor balanced apparatus) to achieve final balance, as indicated by the schematic broken-line connector denoted 81b.

The signal voltage output is withdrawn via lead 82 connected directly with the cathode of triode section 61b, and is applied to linear recorder 38 through a network of current-limiting resistors 83 (typically 20K ohms) and 84 (typically 2K ohms), which latter is provided with a shunt-connected adjustable resistor 85 (typically of 5K ohm span), and span adjustment voltage divider 86 (typically of one K ohm range). The entire assemblage of resistors is provided with a shunt-connected diode-capacitor network consisting of capacitor 88 (typically 70 mfd. size) and diode 89 (typically a type 1N38A), and the network is grounded at 87.

It is important to note that the foregoing circuit is functionally identical with that employed in the photometric analyzer of U.S. patent application S.N. 641,167, of common assignment. Thus, the photometric analyzer can be advantageously employed for particulate solids measurement according to this invention without any alteration other than merely substituting the polarizers, radiation source and sample cell of this invention for the filters, radiation source and sample cell, respectively, of the analyzer, which is extremely advantageous, in that procurement of a separate apparatus for dispersed solids measurement is thereby saved.

In operation, the apparatus must first be calibrated with the specific solid substance and liquid component it is desired to analyze for, and the particle size analysis of the dispersed solid should closely approximate that of the material analyzed. The apparatus is readied for analysis at the outset by first rotating polarizer 35 until the radiation intensities in the first and second paths are balanced closely with solids-free liquid in the sample cell 17. This condition of equality is verified by the obtainment of an equal reading on a high sensitivity voltmeter applied from ground connection 62 to B— and from lead 82 to B—, FIG. 2. The preadjustment is, of course, retained unchanged for all succeeding analyses and experience has shown that no recheck of the setting of polarizer 35 is required thereafter.

Using a logarithmic amplifier 36 for measuring the radiation ratio, i.e., logarithm $I_1/I_2$ (which simply entails the subtraction of the voltage signal generated by the first radiation beam 21 from the voltage signal generated by the second radiation beam 22), essentially linear plots are obtained of analyzer readings displayed on recorder 38 versus parts per million by weight of the solids dispersed in the liquid of the sample. Typical plots of the type secured in the high sensitivity range of 0–20 p.p.m. dispersed solids are shown in FIG. 4 for the same four individual dispersions identified A, B, C, and D, respectively, for which the individual particle size analyses are plotted with the some letter identification in semilogarithmic representation in FIG. 3.

All dispersions tested were made up in water containing 5% of dissolved trisodium phosphate as an aid in the retention of the solids in suspension as the liquid component and the individual solids were: (A) a type of white clay of the grade known as A.S.P. 400, (B) a variety of Georgia clay known as "Lorite," (C) a $TiO_2$ pigment (DuPont Co. Grade R510 and (D) a material known as "Celite," which is a diatomaceous silica. All the dispersions were made by thorough mixing, after which the samples were immediately flowed continuously through a 7″ long sample cell 17 rapidly enough so that there was no settling out of the solids therein. There was a visual perception of slight milkiness in the most concentrated of these dispersions, but the more dilute samples appeared quite transparent to the eye.

As can be ascertained from FIG. 4, the calibration plots obtained were so nearly linear that only two different samples needed to be prepared and evaluated in order to establish any particular plot line, provided, of course, that the two samples were sufficiently different in solids content to be spaced apart over a reasonable interval in the analysis range of interest. Once calibration is completed, analysis of unknown concentrations of the same solids dispersed in the same liquid carriers is performed by merely reading the particular radiation intensity ratio obtained on recorder 38 for each, and then consulting the corresponding calibration plot in order to convert the result into parts per million solids concentration.

The independence of particle size measurement according to this invention with respect to color change in the sample liquid is demonstrated by the following examples:

(a) "Celite" solids of the analysis plotted in FIG 3 were dispersed in several concentrations within the range of 5 to 20 p.p.m. by weight in Am. Public Health Association standard solution No. 500 (which consists of 1.246 gms. $K_2PtCl_6$, 1 gm. crystallized $CoCl_2 \cdot 6H_2O$, 50 gms. trisodium phosphate and 100 ml. conc. HCl, diluted to liter volume with distilled water) which dispersion's possessed a distinct yellowish cast, after which dissolved solids were measured according to this invention in a 7″ long sample cell 17. It was determined that there was less than 1% change in instrument reading over the same concentration samples in clear water containing 5% dissolved trisodium phosphate.

(b) "Celite" dispersions in the same range and concentration as those reported in (a) were examined under conditions where individual colored filters were interposed between polarizer 16 and sample cell 17, by way of simulating different colors of dispersions.

In the first case a Corning CS1–56 glass filter of greenish cast displaying a broad peak at 520 m$\mu$, with 30% transmittance at the peak, was employed. The results obtained were essentially the same as in example (a).

In the second case a Corning CS2–73 glass filter of orange cast displaying sharp cut-off at wavelengths below 580 m$\mu$ was used, again without substantial interference wtih measurement.

It will be understood that the presence of optically active substances, such as sugars, for example, cannot, of course, be tolerated in the samples because of the effect that they independently exert on the analytical radiation employed.

The apparatus is, of course, adapted to both spot sample analysis and continuous service, in the latter case sample throughput of cell 17 being achieved by sample introduction via line 17a and sample exhaust via line 17b. Interpretation of a continuous analysis record in terms of p.p.m. solids is facilitated by the employment of a constant multiplying factor, such as is possible where a logarithmic pick-up is utilized as described. However, while the linearity of indication afforded by logarithmic ratio determination is highly advantageous and is therefore preferred, other electrical circuits having non-linear indication are equally operable.

While the foregoing description has been directed to water as the liquid component of the dispersion, because water is certainly the most usual liquid encountered, other liquids which are optically inactive cause no interference to solids measurement according to this invention. Thus, cyclohexane alone, as well as cyclohexane containing dissolved polyethylene, for example, created no perceptible interference whatever as regarded the measurement of solids dispersed therein.

From the foregoing, it will be understood that this invention can be modified in numerous respects within the skill of the art without departure from its essential spirit, and it is accordingly intended to be limited only within the scope of the following claim.

What is claimed is:

An apparatus for determining the low solids concentration of dispersed particulte solids in liquids comprising, in combination and in optical train, in the order recited, a radiation source provided with a plane polarizer delivering radiation within the range of about 210 m$\mu$ to about 1200 m$\mu$ to obtain an analytical radiation which is forward-scattered by dispersed particulate solids in the liquid of a sample, a radiation-transmitting sample cell, a beam splitter dividing said analytical radiation into a first separate beam and a second separate beam, a polarizer disposed athwart said first separate beam polarizing radiation in said first separate beam in a plane substantially 90° crossed with that of said plane polarizer, radiation preadjustment means disposed athwart said separate beam equalizing the intensity of radiation transmitted in said second separate beam with the intensity of radiation transmitted through said polarizer in said first separate beam for said liquid in the absence of particulate solids, individual radiation detectors disposed in said first separate beam and said second separate beam, respectively, and a dual logarithmic amplifier provided with a linear indicator responsive thereto in electrical circuit with said individual radiation detectors determining the low solids concentration of particles dispersed in the liquid of a sample placed in said sample cell as a function of the ratio of the intensity of radiation transmitted in said first separate beam to the intensity of radiation transmitted in said second separate beam.

(References on following page)

References Cited by the Examiner

UNITED STATES PATENTS

| | | | |
|---|---|---|---|
| 1,712,702 | 6/1929 | Exton | 88—14 |
| 2,630,735 | 3/1953 | Rouy | 88—14 |
| 2,824,488 | 2/1958 | Bridges et al. | 88—65 |
| 2,829,555 | 4/1958 | Keston | 88—14 |
| 3,155,902 | 11/1964 | Walls | 324—61 |

FOREIGN PATENTS

| | | |
|---|---|---|
| 540,876 | 11/1941 | Great Britain. |
| 337,340 | 5/1959 | Switzerland. |

JEWELL H. PEDERSEN, *Primary Examiner.*

O. B. CHEW, *Assistant Examiner.*

UNITED STATES PATENT OFFICE
CERTIFICATE OF CORRECTION

Patent No. 3,283,644                            November 8, 1966

Robert S. Saltzman

It is hereby certified that error appears in the above numbered patent requiring correction and that the said Letters Patent should read as corrected below.

Column 6, line 47, for "particulte" read -- particulate --; line 59, before "separate" insert -- second --; column 7, line 4, for "1,712,702" read -- 1,717,702 --.

Signed and sealed this 12th day of September 1967.

(SEAL)
Attest:

ERNEST W. SWIDER                          EDWARD J. BRENNER
Attesting Officer                               Commissioner of Patents